US012567422B2

(12) United States Patent
Sun et al.

(10) Patent No.: US 12,567,422 B2
(45) Date of Patent: Mar. 3, 2026

(54) METHOD AND APPARATUS FOR ENCODING A MULTI-CHANNEL AUDIO, ELECTRONIC DEVICE, AND STORAGE MEDIUM

(71) Applicant: AAC Acoustic Technologies (Shanghai) Co., Ltd., Shanghai (CN)

(72) Inventors: Xuejing Sun, L.A., CA (US); Mingxin Hui, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 168 days.

(21) Appl. No.: 18/401,257

(22) Filed: Dec. 29, 2023

(65) Prior Publication Data

US 2024/0428805 A1 Dec. 26, 2024

Related U.S. Application Data

(63) Continuation of application No. PCT/CN2023/132921, filed on Nov. 21, 2023.

(30) Foreign Application Priority Data

Jun. 25, 2023 (CN) ......................... 202310755105.7

(51) Int. Cl.

*G10L 19/00* (2013.01)
*G10L 19/008* (2013.01)
*G10L 19/22* (2013.01)

(52) U.S. Cl.

CPC ............ *G10L 19/008* (2013.01); *G10L 19/22* (2013.01)

(58) Field of Classification Search

CPC .............................. G10L 19/008; G10L 19/22
USPC ......................................................... 704/500
See application file for complete search history.

(56) References Cited

FOREIGN PATENT DOCUMENTS

WO WO-2016184958 A1 * 11/2016 ........... G10L 19/008

* cited by examiner

*Primary Examiner* — MD S Elahee
(74) *Attorney, Agent, or Firm* — Wiersch Law Group

(57) ABSTRACT

Provided are method and apparatus for encoding a multi-channel audio, an electronic device, and a storage medium. The method includes: determining encoding units of a multi-channel audio according to an audio type of the multi-channel audio; acquiring importance evaluation indexes of the encoding units of the multi-channel audio; determining encoding modes of the encoding units respectively according to the importance evaluation indexes; and encoding the encoding units in the multi-channel audio respectively based on the encoding modes.

9 Claims, 5 Drawing Sheets

METHOD AND APPARATUS FOR ENCODING A MULTI-CHANNEL AUDIO, ELECTRONIC DEVICE, AND STORAGE MEDIUM

TECHNICAL FIELD

The present disclosure relates to the technical field of audio processing, and in particular, to a method and apparatus for encoding a multi-channel audio in a mixed mode, an electronic device, and a storage medium.

BACKGROUND

Conventional encoding is featured with a small sound quality loss and fast decoding speed at medium and high bit rates. However, the medium and high bit rates may result in a smaller compression ratio, a larger space is required to store encoded audio files, and a larger bandwidth is required to transmit audios in real-time streaming media. In the case of multiple channels, an audio of each channel is stored or transmitted separately, resulting in resource shortage.

With the development of AI technologies, AI-based encoding and decoding technologies have developed rapidly. At present, encoding and decoding using AI technologies are supported by edge devices, and sound quality at low bit rates is much higher than that of the conventional encoding method. However, the AI-based decoding requires more calculation, and computing power is insufficient when AI is applied in the multiple channels.

SUMMARY

The present disclosure provide a method and apparatus for encoding a multi-channel audio, an electronic device, and a storage medium.

In a first aspect of the present disclosure, a method for encoding a multi-channel audio is provided, and the method includes: determining encoding units of a multi-channel audio according to an audio type of the multi-channel audio, where the audio type includes a channel-based type, a scene-based type, and an object-based type; acquiring importance evaluation indexes of the encoding units of the multi-channel audio; determining encoding modes of the encoding units respectively according to the importance evaluation indexes; and encoding the encoding units of the multi-channel audio respectively based on the encoding modes of the encoding units.

In a second aspect of the present disclosure, an apparatus for encoding a multi-channel audio is provided, and the apparatus includes: a first determination module, an acquisition module, a second determination module, and an encoding module.

The first determination module is configured to determine encoding units of a multi-channel audio according to an audio type of the multi-channel audio, where the audio type includes a channel-based type, a scene-based type, and an object-based type.

The acquisition module is configured to acquire importance evaluation indexes of the encoding units of the multi-channel audio.

The second determination module is configured to determine encoding modes of the encoding units respectively according to the importance evaluation indexes.

The encoding module is configured to encode the encoding units in the multi-channel audio respectively based on the encoding modes.

In a third aspect of the present disclosure, an electronic device is provided, including a memory and a processor. The processor is configured to execute a computer program stored in the memory, and the processor, when executing the computer program, performs the method provided in the first aspect of the present disclosure.

In a fourth aspect of the present disclosure, a computer-readable storage medium is provided. The computer-readable storage medium stores a computer program. When the computer program is executed by a processor, the method provided in the first aspect of the present disclosure is implemented.

BRIEF DESCRIPTION OF DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings.

DESCRIPTION OF EMBODIMENTS

In order to make the inventive objectives, features, and advantages of the present disclosure more obvious and understandable, the technical solutions in the embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments in the present disclosure shall fall within the protection scope of the present disclosure.

In addition, the terms "first" and "second" are used for descriptive purposes only, which cannot be construed as indicating or implying a relative importance, or implicitly specifying the number of the indicated technical features. Therefore, the features defined with "first" and "second" may explicitly or implicitly include one or more features. In the description of the embodiments of the present disclosure, "a plurality of" means two or more, unless specifically stated otherwise.

Figure 1:
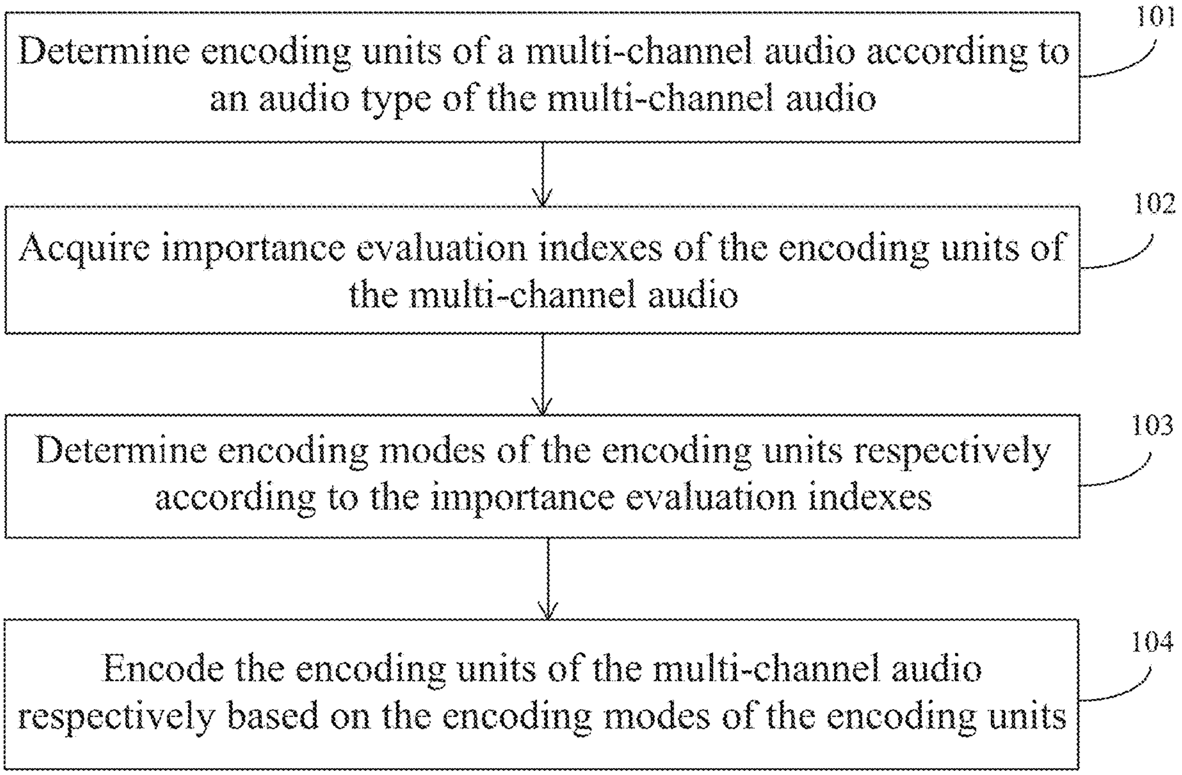
FIG. 1 is a flowchart of a method for encoding a multi-channel audio in a mixed mode according to a first embodiment of the present disclosure.

Conventionally, large resources and computing power are consumed by a single encoding manner. In a first embodiment of the present disclosure, method for encoding a multi-channel audio in a mixed mode is provided. FIG. 1 is a flowchart of the method for encoding a multi-channel audio in a mixed mode provided in this embodiment. The method includes the following steps.

In step 101, encoding units of a to-be-encoded multi-channel audio are determined according to an audio type of the to-be-encoded multi-channel audio.

In some embodiments, different multi-channel audio types correspond to different encoding units. Immersive audio types include a channel based audio type, a scene-based audio type, and an object-based audio type.

In step 102, importance evaluation indexes of the encoding units of the to-be-encoded multi-channel audio are acquired.

In some embodiments, in order to determine encoding modes of different channels in the to-be-encoded multi-channel audio, the importance evaluation indexes of the encoding units of the to-be-encoded multi-channel audio are acquired respectively.

In some embodiments, the encoding units are channels; and the step of acquiring importance evaluation indexes of the encoding units of the to-be-encoded multi-channel audio includes: acquiring a corresponding importance index table according to the audio type of the to-be-encoded multi-channel audio and acquiring importance evaluation indexes of channels of the to-be-encoded multi-channel audio based on the importance index table. The audio type includes a channel-based audio type or a scene-based audio type.

In some embodiments, when the audio type is a channel-based audio type or a scene-based audio type, the encoding units of the to-be-encoded multi-channel audio are determined to be channels, and the corresponding importance index table is acquired according to the corresponding audio types, thereby obtaining importance evaluation indexes of channels in the corresponding to-be-encoded audio.

Further, in some embodiments, the step of acquiring a corresponding importance index table according to the audio type of the to-be-encoded multi-channel audio includes: acquiring a multi-channel format of the to-be-encoded multi-channel audio whose audio type is the channel-based audio type, and acquiring the corresponding importance index table according to the multi-channel format.

In this embodiment, the audio type of the to-be-encoded audio is channel-based, and a corresponding importance index table may be determined according to a multi-channel format of the to-be-encoded audio. In this embodiment, channel importance indexes (ranging from 0 to 10) of different channels may be sorted according to the multi-channel format. The greater the value of the channel importance index, the higher the importance of the channel importance index. The multi-channel format may be 5.1 channel, 5.1.2 channel, 7.1 channel, or 7.1.4 channel. Taking the 5.1 channel as an example, the 5.1 channel includes a front left channel (Left), a front right channel (Right), a center channel (Center), a left channel (Left Surround), a right channel (Right Surround), and a bass channel (Subwoofer). Audio information is mainly stored in the front left channel L, the front right channel R, and the center channel C. Therefore, the L, R, and C channels are of the highest importance, and the remaining channels are of lower importance. A corresponding relationship between the channels in the 5.1 channel and channel importance (CHI) is shown in Table 1:

TABLE 1

| Channel name | CHI |
|---|---|
| Left | 10 |
| Right | 10 |
| Center | 10 |
| Left Surround | 6 |
| Right Surround | 6 |
| Subwoofer | 3 |

For the 5.1.2 channel, 2 sky channels are added on the basis of the 5.1 channel, namely a Left Top Middle channel and a Right Top Middle channel. A corresponding relationship between the two sky channels in the 5.1.2 channel and the channel importance (CHI) is shown in Table 2:

TABLE 2

| Channel name | CHI |
|---|---|
| Left Top Middle | 3 |
| Right Top Middle | 3 |

The 7.1 channel further includes a left rear surround channel (Left Rear Surround) and a right rear surround channel (Right Rear Surround) compared with the 5.1 channel. A corresponding relationship between the channels in the 7.1 channel and the CHI is shown in Table 3:

TABLE 3

| Channel name | CHI |
|---|---|
| Left | 10 |
| Right | 10 |
| Center | 10 |
| Left Surround | 6 |
| Right Surround | 6 |
| Left Rear Surround | 6 |
| Right Rear Surround | 6 |
| Subwoofer | 3 |

For the 7.1.4 channel, 4 sky channels are added on the basis of the 7.1 channel, namely Left Top Front, Right Top Front, Left Top Rear, and Right Top Rear. A corresponding relationship between the 4 sky channels in the 7.1.4 channel and the CHI is shown in Table 4:

TABLE 4

| Channel name | CHI |
|---|---|
| Left Top Front | 3 |
| Right Top Front | 3 |
| Left Top Rear | 3 |
| Right Top Rear | 3 |

Further, in some embodiments, the step of acquiring importance evaluation indexes of channels of the to-be-encoded multi-channel audio based on the importance index table includes: acquiring a higher order Ambisonics (HOA) order corresponding to the to-be-encoded multi-channel audio whose audio type is scene-based; determining a number of channels of the to-be-encoded multi-channel audio based on the HOA order; and obtaining, from the importance index table, the importance evaluation indexes of the channels of the to-be-encoded multi-channel audio according to the number of channels.

In this embodiment, when the audio type of the to-be-encoded audio is scene-based, the number of channels of the to-be-encoded audio may be determined based on an HOA order of the to-be-encoded audio, and then the importance evaluation indexes of the channels are further determined according to the number of channels. It is noted that, during reconstruction of a sound field, an HOA signal is encoded. Higher-order Ambisonics signals can achieve higher spatial resolution and spatial immersion, but require more channels, which may be sorted by CHI. Since the audio information is mainly in low-order signals, lower-order Ambisonics corresponds to higher CHI, and high-order Ambisonics corresponds to lower CHI. A corresponding relationship between HOA orders and a number of channels may be expressed as (N+1)^2, where N denotes an HOA order, as shown in Table 5:

TABLE 5

| HOA order | Number of channels |
|---|---|
| 1 | 4 |
| 2 | 9 |
| 3 | 16 |

Figure 2:
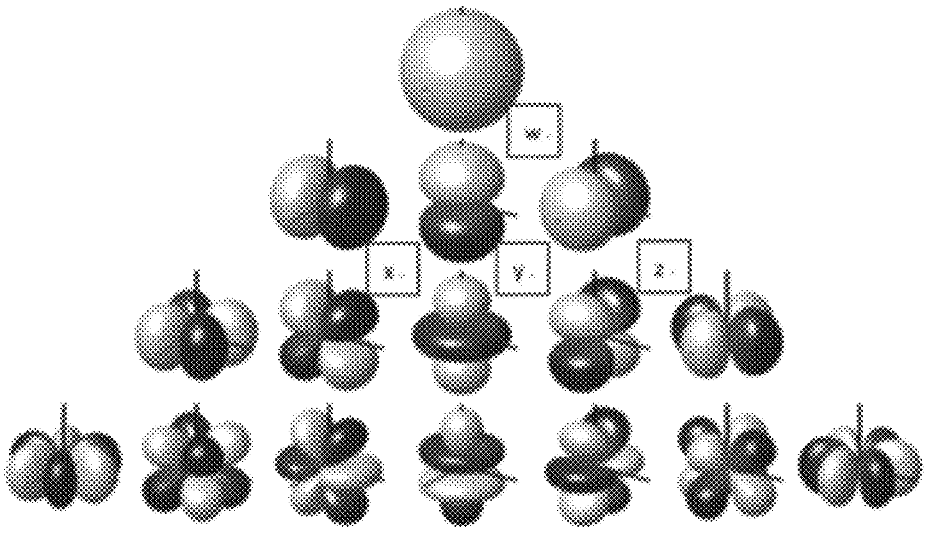
FIG. 2 is a schematic diagram showing a sound channel of a third-order HOA signal according to the first embodiment of the present disclosure.

Taking a three-order HOA signal as an example, a schematic diagram of sound channels thereof is shown in FIG. 2. A number of the channels thereof is 16. Since lower-order channels include more information, scene importance (SCI) corresponding to the channels from top to bottom in FIG. 2 is 10, 8, 6, and 4 respectively.

In some other embodiments, the encoding units are objects, and the step of acquiring importance evaluation indexes of the encoding units of the to-be-encoded multichannel audio includes: acquiring importance evaluation indexes of objects of the object-based to-be-encoded multichannel audio according to a preset professional database. In this embodiment, when the audio type of the to-be-encoded audio is object-based, the encoding units are determined to be objects, and importance evaluation indexes of the to-be-encoded audio in the object-based audio type may be set by a corresponding designer. It is to be noted that, when an immersive audio of the object-based audio type is encoded and decoded in units of objects, for example, when there are N objects, object importance (OBI) thereof is object_1, object_2, . . . , and object_N respectively, and the N objects are encoded and decoded during the encoding.

In step 103, encoding modes of the encoding units are determined respectively according to the importance evaluation indexes.

In this embodiment, after the corresponding importance evaluation indexes of the encoding units such as channels and objects are acquired, encoding modes of the encoding units may be determined accordingly. The encoding modes may be an AI encoding scheme such as lyra V2 (an extremely low bit rate speech codec) and a traditional encoding scheme such as an opus encoder. Supported encoding types are shown in Table 6:

TABLE 6

| Codec name | Bit rate (kbps) | Codec mode |
|---|---|---|
| AI3.2 | 3.2 | Lyra V2 |
| AI6 | 6 | |
| AI9.6 | 9.6 | |
| Opus12 | 12 | Opus |
| Opus16 | 16 | |
| Opus32 | 32 | |
| Opus64 | 64 | |
| Opus96 | 96 | |

TABLE 6-continued

| Codec name | Bit rate (kbps) | Codec mode |
|---|---|---|
| Opus128 | 128 | |
| Opus192 | 192 | |
| Opus256 | 256 | |
| Opus320 | 320 | |

In some embodiments, the step of determining encoding modes of the encoding units respectively according to the importance evaluation indexes includes: obtaining a corresponding first encoding-mode index table according to a network bandwidth; and querying the first encoding-mode index table according to the importance evaluation indexes, to obtain the encoding modes of the encoding units.

In this embodiment, a corresponding encoding-mode index table may be determined according to the network bandwidth, and the encoding-mode index table includes a corresponding relationship between importance evaluation indexes of encoding units and network bandwidths. The encoding-mode index table in this embodiment is generated in the following manner. Importance evaluation indexes (CHI) of all channels of a corresponding type (for example, all channels of a to-be-encoded audio of the channel-based audio type) are sorted from low to high. CHI of an idxth channel is CHIIdx, a bit rate of the corresponding encoding manner is BitRateIdx, a total bandwidth is BandWidthSum kbps, a minimum encoding rate is BitRateMin (corresponding to 3.2 kbps), and a maximum encoding rate is BitRateMax (corresponding to 320 kbps). Then, calculation is performed sequentially from the channel with the lowest CHI to obtain a target bit rate, and a corresponding encoding mode is determined. Pseudocode of the calculation manner is as follows:

$$BitRateIdx = BandWidthSum * CHIIdx / CHISum$$

$$BitRateIdx = \min(BitRateIdx, BitRateMin)$$

$$BitRateIdx = \text{floor}(BitRateIdx)$$

Herein, BitRateIdx-floor (BitRateIdx) denotes acquiring the highest bit rate no greater than BitRateIdx in a bit rate table, and CHISum denotes a total importance evaluation index. Taking the 5.1 channel as an example, initial encoding manners of respective channels are shown in Table 7:

TABLE 7

| Channel name | Encoding manner |
|---|---|
| Left | Opus16 |
| Right | Opus16 |
| Center | Opus16 |
| Left Surround | Opus12 |
| Right Surround | Opus12 |
| Subwoofer | AI6 |

When a total bandwidth is 1 Mkbps, encoding manners of respective channels are shown in Table 8:

TABLE 8

| Channel name | Encoding manner |
|---|---|
| Left | Opus192 |
| Right | Opus192 |

TABLE 8-continued

| Channel name | Encoding manner |
|---|---|
| Center | Opus192 |
| Left Surround | Opus128 |
| Right Surround | Opus128 |
| Subwoofer | Opus64 |

Moreover, when the network bandwidth is reduced during the encoding and decoding, the encoding manner of the channel with the lowest CHI may be reduced first.

In some other embodiments, the step of determining encoding modes of the encoding units respectively according to the importance evaluation indexes includes:

acquiring a reserved storage space size for an encoded audio; determining an average storage space size per unit time according to the reserved storage space size; obtaining a second encoding-mode index table corresponding to the average storage space size per unit time; and querying the second encoding-mode index table according to the importance evaluation indexes, to obtain the encoding modes corresponding to the encoding units.

For example, in the case of non-network transmission, space is reserved to store an encoded audio signal. In the case of multiple channels, if all the channels are encoded by the high bit rate, a huge space is occupied. Therefore, different codec modes may be selected according to importance of the channels (or objects). Lower importance indicates that less information is included, and a lower bit rate encoding manner may be used. Therefore, in this embodiment, an encoding-mode index table including a corresponding relationship between average storage space sizes per unit time and importance evaluation indexes is further set. A manner of generating the encoding-mode index table may be obtained with reference to the encoding-mode index table corresponding to network bandwidths. For example, an average storage space of audio per second is 100 kbits, which is analogous to a network bandwidth of 100 kbps.

In step 104, the encoding units in the to-be-encoded multi-channel audio are encoded respectively based on different encoding modes.

For example, encoding modes of the encoding units are acquired respectively, so that the multi-channel audio can be encoded and decoded in a mixed mode. Mixed-mode encoding and decoding of the multi-channel audio may have practical value in audio storage and real-time streaming media. For example, a current AI codec may consume a lot of computing power during the decoding. However, in coding and decoding of multi-channel audio, especially on storage media, traditional encoding is still dominant, supplemented by AI encoding. Therefore, using AI encoding for some unimportant information can reduce storage resource consumption required. In real-time streaming media, such as live broadcasts and video conferencing, real-time performance of encoding, CPU occupancy, bandwidth, and the like all directly affect final experience, especially advantages of the low bit rate in weak network conditions are irreplaceable. Through mixed-mode encoding and decoding, an audio bit rate can be reduced autonomously in the case of a limited network, thereby ensuring smoothness and continuity of user listening sense.

Based on the technical solution in above embodiments of the present disclosure, encoding units of a to-be-encoded multi-channel audio are determined according to an audio type of the to-be-encoded multi-channel audio, and the audio type includes a channel-based audio type, a scene-based audio type, and an object-based audio type. Importance evaluation indexes of the encoding units of the to-be-encoded multi-channel audio are acquired, encoding modes corresponding to the encoding units are determined respectively according to the importance evaluation indexes, and the encoding units in the to-be-encoded multi-channel audio are encoded respectively based on the different encoding modes. Through the solutions of the present disclosure, encoding units are determined according to the audio type of the to-be-encoded audio, importance evaluation indexes of the encoding units are acquired, encoding modes are determined according to the importance evaluation indexes, and finally, the encoding units are encoded based on the different encoding modes, so as to use corresponding encoding manners in different scenes to meet resource and computing power requirements and ensure smoothness and continuity of the audio.

Figure 3:
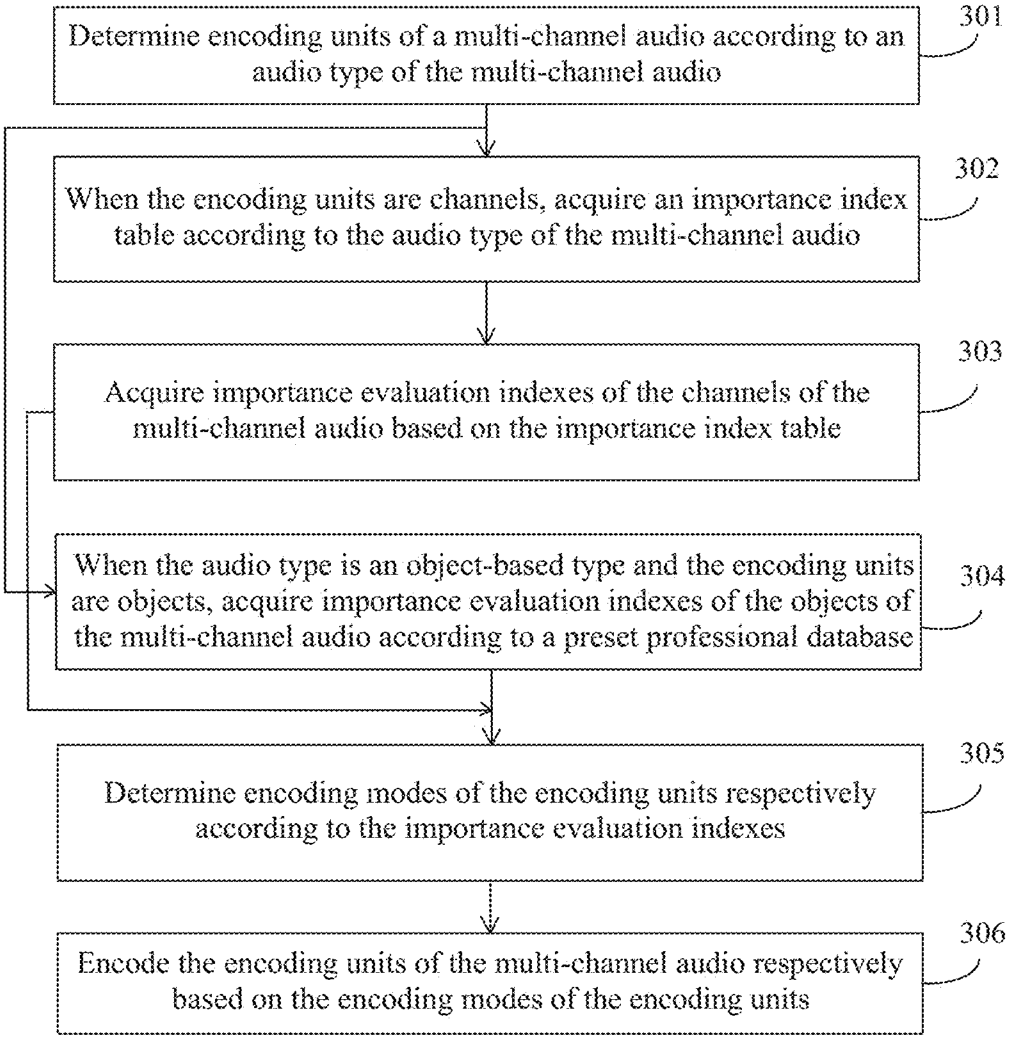
FIG. 3 is a flowchart of a method for encoding a multi-channel audio in a mixed mode according to a second embodiment of the present disclosure.

FIG. 3 shows a flowchart of a method for encoding a multi-channel audio in a mixed mode according to a second embodiment of the present disclosure. The method for encoding a multi-channel audio in a mixed mode includes the following steps.

In step 301, encoding units of a to-be-encoded multi-channel audio are determined according to an audio type of the to-be-encoded multi-channel audio.

In step 302, when the encoding units are sound channels, a corresponding importance index table is acquired according to the audio type of the to-be-encoded multi-channel audio.

In step 303, importance evaluation indexes of the channels of the to-be-encoded multi-channel audio are acquired based on the importance index table.

In step 304, when the encoding units are objects, importance evaluation indexes of the objects of the object-based to-be-encoded multi-channel audio are acquired according to a preset professional database.

In step 305, encoding modes of the encoding units are determined respectively according to the importance evaluation indexes.

In step 306, the encoding units in the to-be-encoded multi-channel audio are encoded respectively based on the different encoding modes.

For example, in this embodiment, it should be understood that sequence numbers of the steps in the embodiments do not mean execution sequences. The execution sequences of the steps should be determined based on functions and internal logic thereof, and should not constitute an only limitation on the implementation process of the embodiments of the present disclosure.

Based on the above technical solution in embodiments of the present disclosure, when the encoding units are channels, an importance index table is acquired according to the audio type (channel-based or scene-based) of the multi-channel audio; importance evaluation indexes of channels of the multi-channel audio are acquired based on the importance index table; when the encoding units are objects, importance evaluation indexes of objects of the object-based type of multi-channel audio are acquired according to a preset professional database; encoding modes of the encoding units are determined respectively according to the importance evaluation indexes; and the encoding units in the multi-channel audio are encoded respectively based on the different encoding modes. Through the solutions of the present disclosure, encoding units are determined according to the audio type of the to-be-encoded audio, importance evaluation indexes of the encoding units are acquired, encoding modes of the encoding units are determined according to the importance evaluation indexes, and finally, the encoding units are encoded based on the encoding modes. In this way, appropriate encoding manners are used in different scenes to meet resource and computing power requirements and ensure smoothness and continuity of the audio.

Figure 4:
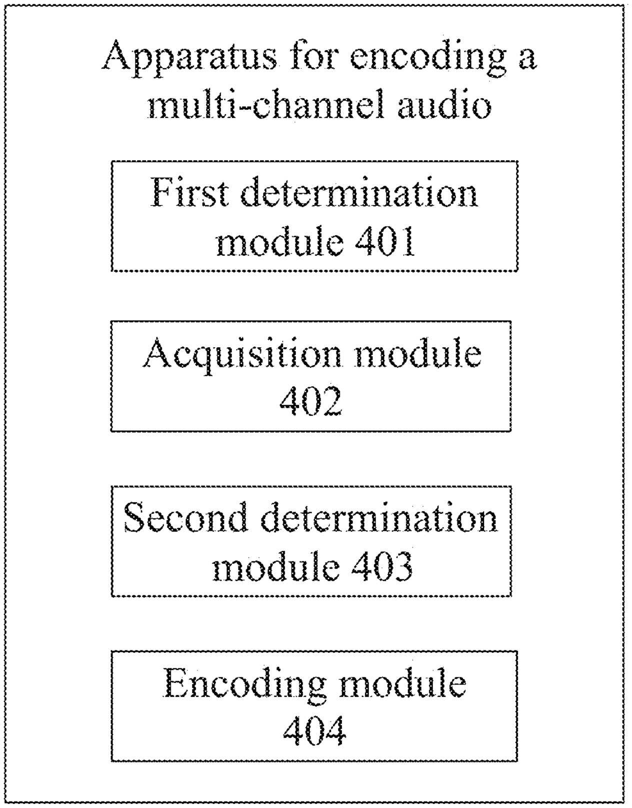
FIG. 4 is a schematic diagram of an apparatus for encoding a multi-channel audio in a mixed mode according to a third embodiment of the present disclosure.

FIG. 4 shows an apparatus for encoding a multi-channel audio according to a third embodiment of the present disclosure. The apparatus may be applied to the foregoing method for encoding a multi-channel audio. As shown in FIG. 4, the apparatus mainly includes: a first determination module 401, an acquisition module 402, a second determination module 403, and an encoding module 404.

The first determination module 401 is configured to determine encoding units of a to-be-encoded multi-channel audio according to an audio type of the to-be-encoded multi-channel audio, where the audio type includes a channel-based type, a scene-based type, and an object-based type.

The acquisition module 402 is configured to acquire importance evaluation indexes of the encoding units of the to-be-encoded multi-channel audio.

The second determination module 403 is configured to determine encoding modes of the encoding units respectively according to the importance evaluation indexes.

The encoding module 404 is configured to encode the encoding units in the to-be-encoded multi-channel audio respectively based on the different encoding modes.

In some embodiments, the encoding units are channels; and the acquisition module is configured to acquire an importance index table according to the audio type of the to-be-encoded multi-channel audio, where the audio type is the channel-based type or the scene-based type; and acquire importance evaluation indexes of the channels of the to-be-encoded multi-channel audio based on the importance index table.

Further, in some embodiments, the acquisition module is further configured to acquire a multi-channel format of the to-be-encoded multi-channel audio of the channel-based type; and acquire the importance index table according to the multi-channel format.

Further, in some embodiments, the apparatus further includes: a query module configured to acquire an HOA order of the to-be-encoded multi-channel audio of the scene-based type; determine a number of the channels of the to-be-encoded multi-channel audio based on the HOA order; and query the importance index table for the importance evaluation indexes of the channels of the to-be-encoded multi-channel audio according to the number of the channels.

In some embodiments, the encoding units are objects, and the acquisition module is configured to acquire importance evaluation indexes of the objects of the to-be-encoded multi-channel audio of the object-based type according to a preset professional database.

In some embodiments, the second determination module is configured to acquire a first encoding-mode index table according to a network bandwidth; and query the first encoding-mode index table according to the importance evaluation indexes, to obtain the encoding modes of the encoding units.

In some embodiments, the second determination module is further configured to acquire a reserved storage space size for the encoded multi-channel audio; determine an average storage space size for audio per unit time according to the reserved storage space size; acquire a second encoding-mode index table according to the average storage space size for audio per unit time; and query the second encoding-mode index table according to the importance evaluation indexes, to obtain the encoding modes of the encoding units.

It should be noted that the methods for encoding a multi-channel audio in the foregoing embodiments may all be implemented based on the apparatus for encoding a multi-channel audio provided in this embodiment. Those of ordinary skill in the art can clearly understand that, for the convenience and simplicity of description, a specific operating process of the apparatus described in this embodiment may be obtained with reference to the corresponding process in the foregoing method embodiments. Details are not described herein again.

Based on the technical solution in the above embodiment of the present disclosure above, encoding units of a multi-channel audio are determined according to an audio type of the multi-channel audio, where the audio type may be a channel-based type, a scene-based type, and an object-based type; importance evaluation indexes of the encoding units of the multi-channel audio are acquired; encoding modes of the encoding units are determined respectively according to the importance evaluation indexes; and the encoding units in the multi-channel audio are encoded respectively based on the different encoding modes. Through the solutions of the present disclosure, encoding units are determined according to the audio type of the to-be-encoded audio, importance evaluation indexes of the encoding units are acquired, encoding modes of the encoding units are determined according to the importance evaluation indexes, and finally, the encoding units are encoded based on the different encoding modes. In this way, appropriate encoding manners are used in different scenes to meet resource and computing power requirements and ensure smoothness and continuity of the audio.

Figure 5:
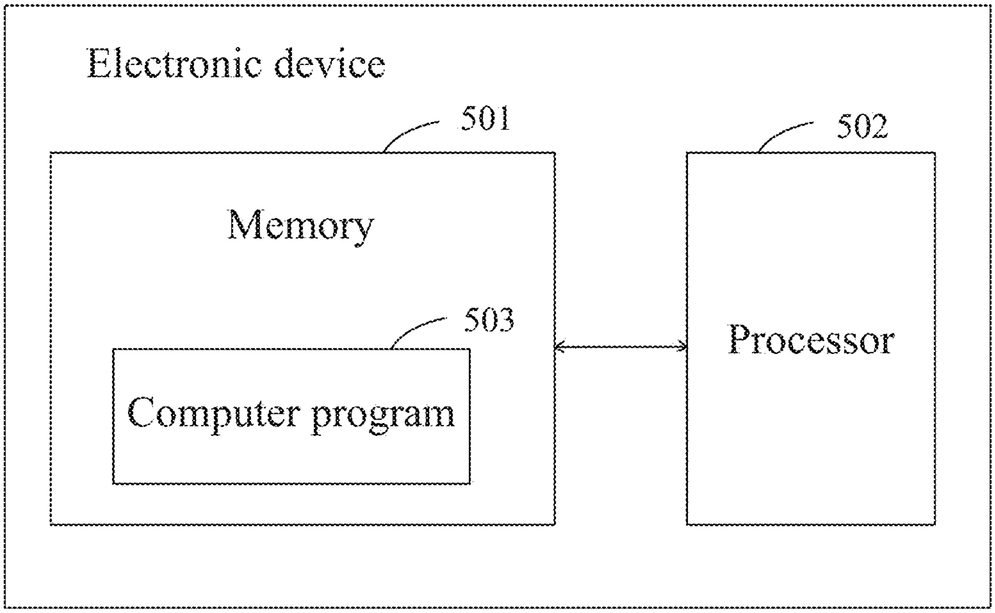
FIG. 5 is a schematic structural diagram of an electronic device according to a fourth embodiment of the present disclosure.

FIG. 5 is a schematic diagram of an electronic device according to a fourth embodiment of the present disclosure. The electronic device may be configured to implement the method for encoding the multi-channel audio in the foregoing embodiments. The electronic device includes a memory 501, a processor 502, and a computer program 503 stored in the memory 501 and executable by the processor 502.

The memory 501 and the processor 502 are in communication connection. The processor 502, when executing the computer program 503, performs the method in the foregoing first or second embodiment. One or more processors may be provided.

The memory 501 may be a high-speed random access memory (RAM), or may be a non-volatile memory such as a magnetic disk memory. The memory 501 is configured to store executable program code, and the processor 502 is coupled to the memory 501.

Further, an embodiment of the present disclosure further provides a non-transitory computer-readable storage medium. The computer-readable storage medium may be arranged in the above electronic device. The computer-readable storage medium may be the memory in the embodiment shown in FIG. 5.

The computer-readable storage medium stores a computer program. When the program is executed by a processor, the method for encoding the multi-channel audio in the foregoing embodiments is performed. Further, the computer-readable storage medium may alternatively be any medium that can store program code such as a USB flash disk, a mobile hard disk, a read-only memory (ROM), a RAM, a magnetic disk, or an optical disc.

In the embodiments provided in the present disclosure, it should be understood that the apparatus and method disclosed may be implemented in other manners. For example, the apparatus embodiments described above are only illustrative. For example, the division of the modules is merely logical function division, and there may be other division manners in an actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between apparatuses or modules may be implemented in an electric form, a mechanical form, or other forms.

The modules described as separate parts may or may not be physically separate, and parts displayed as modules may or may not be physical modules, may be located at one position, or may be distributed on a plurality of network modules. Some or all of the modules may be selected according to actual requirements to achieve the objective of the solution of this embodiment.

In addition, the functional modules in the embodiments of the present disclosure may be integrated into one processing module, or each of the modules may exist alone physically, or two or more modules are integrated into one module. The integrated module may be implemented in a form of hardware or in a form of a software functional module.

The integrated module may be stored in a computer-readable storage medium when implemented in the form of the software functional module and sold or used as a separate product. Based on such an understanding, the technical solutions in the present disclosure essentially, or the part contributing to the prior art, or some of the technical solutions may be implemented in the form of a software product. The computer software product is stored in a readable storage medium, and includes several instructions for causing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. In addition, those skilled in the art should also appreciate that all the embodiments described in the specification are preferred embodiments, and the related actions and modules are not necessarily mandatory to the present disclosure.

In the above embodiments, the descriptions of the embodiments have respective focuses. For a part that is not described in detail in one embodiment, refer to related descriptions in other embodiments.

The above are descriptions about the multi-channel audio mixed-mode encoding method and apparatus, the device, and the medium provided in the present disclosure. For those skilled in the art, there may be changes in specific embodiments and an application scope based on the ideas of the embodiments of the present application. In summary, the content of this specification should not be understood as a limitation on the present application.

What is claimed is:

1. A method for encoding a multi-channel audio, comprising:

determining encoding units of the multi-channel audio according to an audio type of the multi-channel audio, wherein the audio type comprises a channel-based type, a scene-based type, and an object-based type;

acquiring importance evaluation indexes of the encoding units of the multi-channel audio;

determining encoding modes of the encoding units according to the importance evaluation indexes; and encoding the encoding units of the multi-channel audio respectively according to the encoding modes of the encoding units.

2. The method of claim 1, wherein the encoding units are channels, and the acquiring importance evaluation indexes of the encoding units of the multi-channel audio comprises:

acquiring an importance index table according to the audio type of the multi-channel audio when the audio type is the channel-based type or the scene-based type; and acquiring importance evaluation indexes of the channels of the multi-channel audio based on the importance index table.

3. The method of claim 2, wherein the acquiring the importance index table according to the audio type of the multi-channel audio comprises:

acquiring a multi-channel format of the multi-channel audio when the audio type of the multi-channel audio is the channel-based type; and acquiring the importance index table according to the multi-channel format.

4. The method of claim 2, wherein the acquiring importance evaluation indexes of the channels of the multi-channel audio based on the importance index table comprises:

acquiring a higher order Ambisonics (HOA) order of the multi-channel audio when the audio type of the multi-channel audio is the scene-based type;

determining a number of the channels of the multi-channel audio based on the HOA order; and acquiring, from the importance index table, the importance evaluation indexes of the channels of the multi-channel audio according to the number of the channels.

5. The method of claim 1, wherein the encoding units are objects, and the acquiring importance evaluation indexes of the encoding units of the multi-channel audio comprises:

acquiring importance evaluation indexes of the objects of a to-be-encoded multi-channel audio according to a preset professional database when the audio type of the multi-channel audio is the object-based type.

6. The method of claim 1, wherein the determining the encoding modes of the encoding units according to the importance evaluation indexes comprises:

acquiring a first encoding-mode index table according to a network bandwidth; and acquiring, from the first encoding-mode index table, the encoding modes of the encoding units according to the importance evaluation indexes.

7. The method of claim 1, wherein the determining the encoding modes of the encoding units according to the importance evaluation indexes comprises:

acquiring a reserved storage space size for an encoded multi-channel audio;

determining an average storage space size for audio per unit time according to the reserved storage space size;

acquiring a second encoding-mode index table according to the average storage space size for audio per unit time; and acquiring, from the second encoding-mode index table, the encoding modes of the encoding units according to the importance evaluation indexes.

8. An apparatus for encoding a multi-channel audio in a mixed mode, comprising:

a first determination module configured to determine encoding units of the multi-channel audio according to an audio type of the multi-channel audio, wherein the audio type includes a channel-based type, a scene-based type, and an object-based type;

an acquisition module configured to acquire importance evaluation indexes of the encoding units of the multi-channel audio;

a second determination module configured to determine encoding modes of the encoding units respectively according to the importance evaluation indexes of the encoding units; and an encoding module configured to encode the encoding units in the multi-channel audio respectively based on the encoding modes of the encoding units.

9. An electronic device, comprising a memory and a processor, wherein the processor is configured to execute a computer program stored in the memory; and the processor, when executing the computer program, performs the method of claim 1.

* * * * *